March 10, 1964 H. P. T. CORLEY ETAL 3,124,368
ELECTRONIC CONTROLLED VEHICLE SUSPENSION SYSTEM
Filed Nov. 14, 1960 4 Sheets-Sheet 1

INVENTORS
HENRY P. T. CORLEY
LOYD G. DORSETT

ATTORNEY

March 10, 1964   H. P. T. CORLEY ETAL   3,124,368
ELECTRONIC CONTROLLED VEHICLE SUSPENSION SYSTEM
Filed Nov. 14, 1960   4 Sheets-Sheet 2
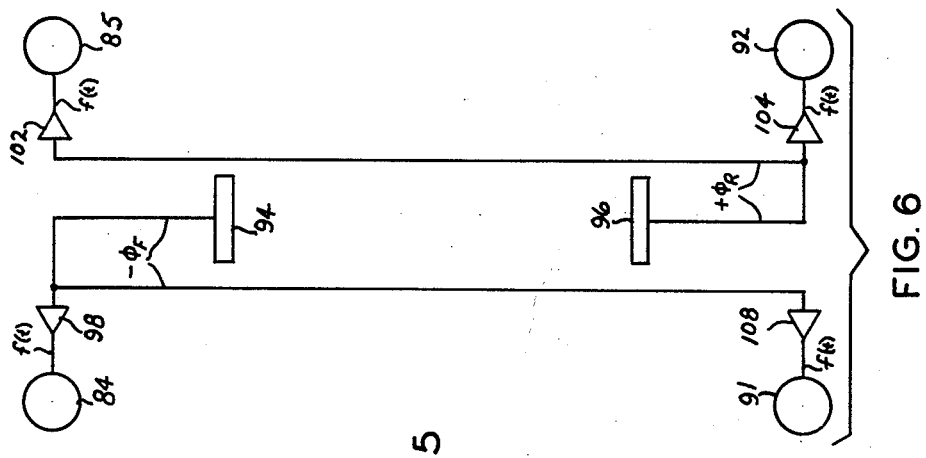
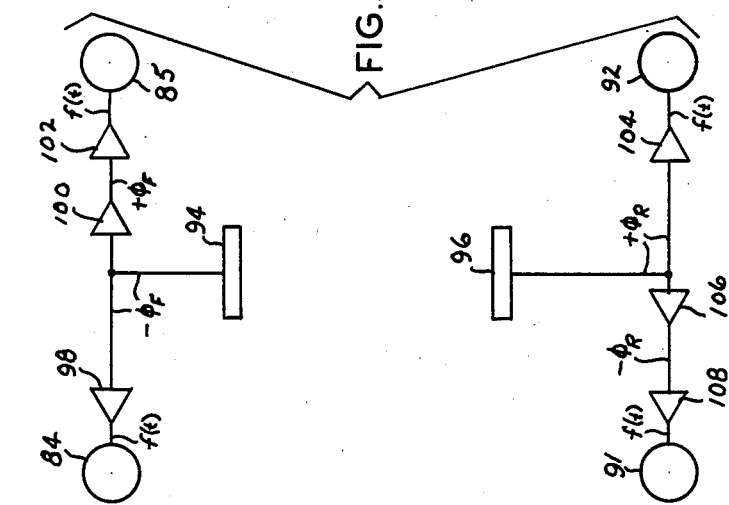
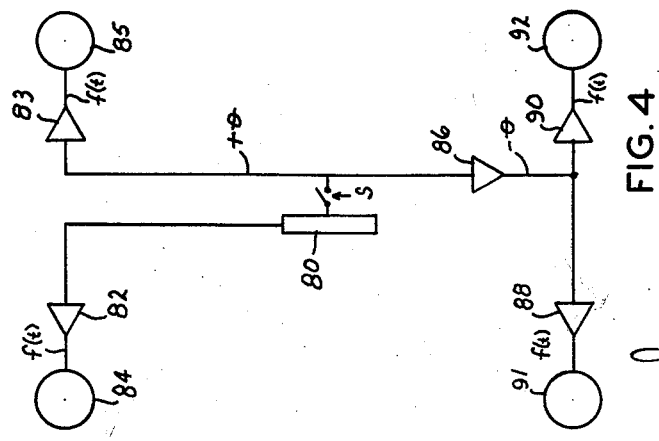
INVENTORS
HENRY P. T. CORLEY
LOYD G. DORSETT
BY Loyd J. Miller
ATTORNEY March 10, 1964   H. P. T. CORLEY ETAL   3,124,368
ELECTRONIC CONTROLLED VEHICLE SUSPENSION SYSTEM
Filed Nov. 14, 1960   4 Sheets-Sheet 3

INVENTORS
HENRY P. T. CORLEY
LOYD G. DORSETT

ATTORNEY

March 10, 1964 H. P. T. CORLEY ETAL 3,124,368
ELECTRONIC CONTROLLED VEHICLE SUSPENSION SYSTEM
Filed Nov. 14, 1960 4 Sheets-Sheet 4
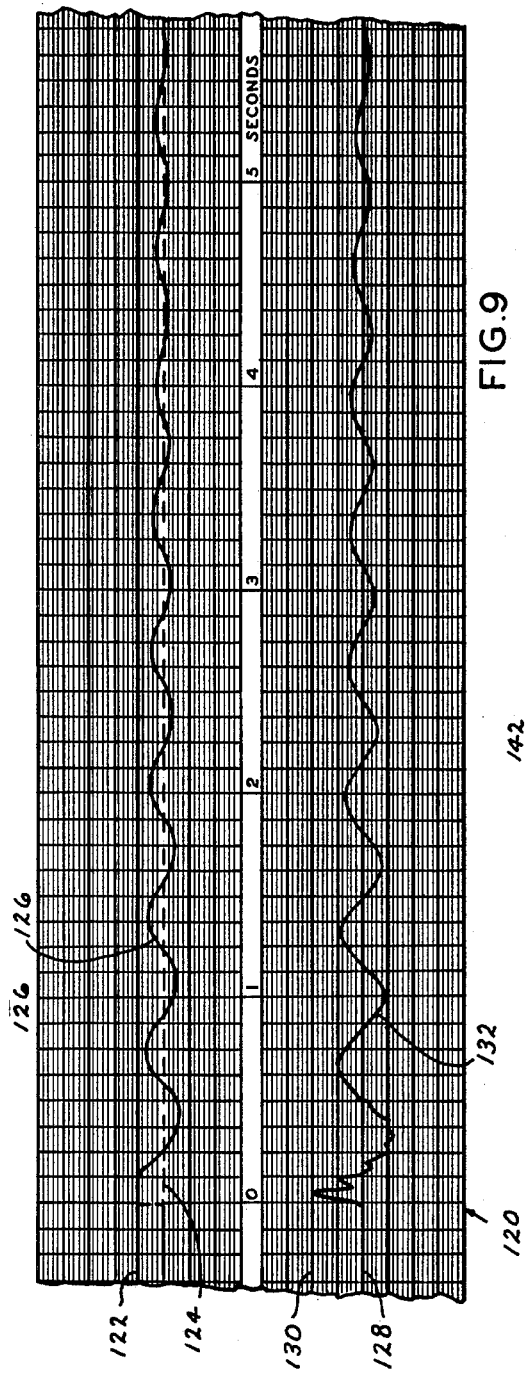
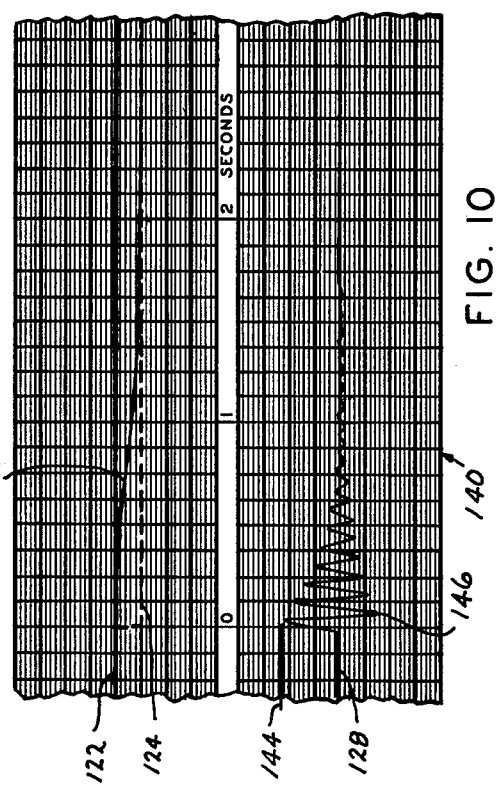
INVENTORS
HENRY P. T. CORLEY
LOYD G. DORSETT
ATTORNEY

United States Patent Office 3,124,368
Patented Mar. 10, 1964

3,124,368
ELECTRONIC CONTROLLED VEHICLE SUSPENSION SYSTEM
Henry P. T. Corley, Oklahoma City, and Loyd G. Dorsett, Norman, Okla., assignors to Dorsett Electronics Laboratories, Inc., Norman, Okla., a corporation of Oklahoma
Filed Nov. 14, 1960, Ser. No. 68,706
1 Claim. (Cl. 280—6)

The invention described herein may be manufactured and used by or for the United States Government for military aircraft only, without the payment of any royalties thereon.

The present invention relates to suspension systems and more particularly to a suspension system for a wheel supported frame.

Automobile manufacturers, in trying to achieve the best possible suspension system consistent with economy of production, have tried out several different types of suspension systems with various degrees of success. An ideal suspension system for an automobile, or the like, should provide a maximum degree of horizontal stability of the vehicle frame regardless of the unevenness of the terrain over which the vehicle travels. Torsion bars, coil and leaf springs are all practically equivalent from the point of view of their mechanical characteristics. Relatively stiff springs tend to present a smaller oscillatory tendency of the vehicle whereas soft springs permit the absorption of more severe road shocks without transmission directly to the vehicle occupants. Air suspension systems featuring automatic leveling functions have been found unsatisfactory, since the air springs frequently collapse when the engine can not be started. One type of air insert cylinder presently available for vehicles improves riding characteristics but does not provide automatic adjustment features. None of the above mentioned suspension systems, or other experimental models, have achieved automatic banking to provide a more comfortable ride around unbanked or poorly banked turns.

It is, therefore, the principal object of the instant invention to provide a vehicle suspension system which will provide a maximum amount of comfort for the occupants of the vehicle.

Other objects automatically achieved by the present invention provide; banking of a car negotiating a curve; pitch compensation of a vehicle frame whether it is traveling up or down a hill in order to keep the frame more nearly level; pitch rate control of vehicle frame, so that sudden rises and dips in the highway produce only negligible discomfort to the vehicle occupants due to rapid pitch changes; lateral leveling of the vehicle frame so that crowns or high shoulders of a highway produce no tendency for one side of the vehicle to be lower than the other; damping of bounce, to reduce the effects of road bumps and pot holes, to almost negligible proportions; elevation of the rear end of an automobile frame to clear the ground when entering or leaving a steep driveway; yaw stabilization to eliminate undesirable yaw oscillations or "fish tailing"; change over from "soft" to "stiff" ride characteristics as road conditions demand; reduction of undesirable pitch changes of a vehicle frame due to acceleration or decelerations of the vehicle; and hydraulic and electrical fail-safe design of components so that a fully compentent conventional mechanical suspension system is utilized at any time that the automatic system fails to operate properly.

Still another object is the provision of manual "on-off" control of any primary mode of automatic operation in order to facilitate trouble shooting and system maintenance.

Briefly stated the present invention is a servo motor stabilized, automatic signal feedback suspension system which accomplishes these and other performance objects by superimposing hydraulic cylinders upon conventional mechanical suspension system elements, one above each wheel. The action of these high performance hydraulic cylinders is electronically controlled by special purpose analog computing circuitry which is activated by input signals from a number of error sensing linear rate transducers and/or accelerometers. The hydraulic cylinders are extended or contracted precisely the right amount at precisely the right time through the medium of hydraulic servo valves connected with the computer.

Other objects will be apparent from the following description when taken in conjunction with the accompanying 4 sheets of drawings, wherein:

FIGURE 4 is a diagrammatic view of the pitch control signal flow;

FIGURES 5 and 6 are diagrammatic views illustrating two methods of roll control signal flow;

FIGURE 9 is a reproduction of an oscillographic recording of vehicle frame accelerations obtained by analog computer simulation; and, FIGURE 10 is a reproduction of an oscillographic recording of the damping of vehicle frame accelerations obtained by analog computer simulation of the instant invention.

Like characters of reference designate like parts in those figures of the drawings in which they occur.

In the drawings:

Figure 1:
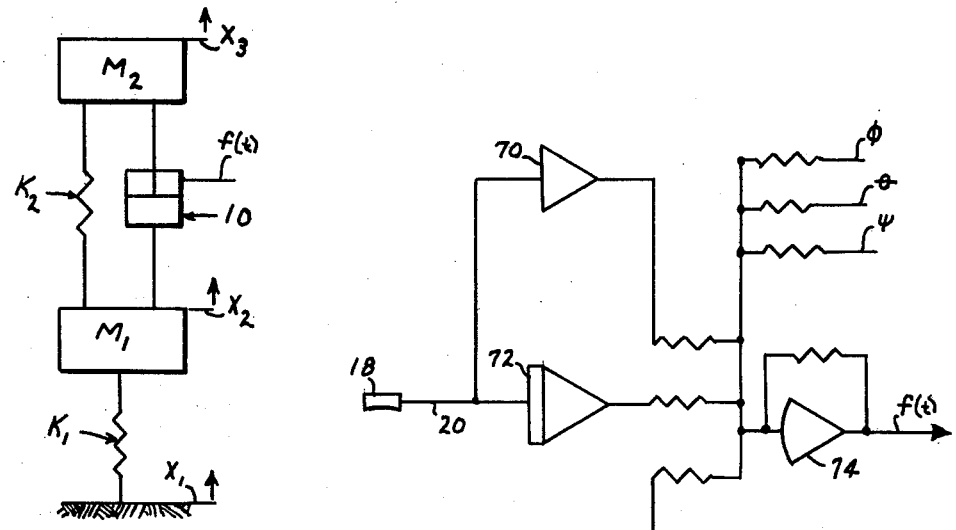
FIGURE 1 is a diagrammatic view of the components of the suspension system at one wheel location.

Referring more particularly to FIG. 1, the letter $M_1$ indicates the mass of a vehicle tire, wheel and axle. The letter $M_2$ indicates the mass of the vehicle over one wheel location. $K_1$ indicates the spring coefficient of the vehicle tire in contact with the road surface elevation indicated by the letter $X_1$. A main spring $K_2$, which may be any type conventional main spring presently employed, supports the vehicle mass $M_2$ in spaced relation with respect to the wheel, tire and axle. The reference numeral 10 indicates a hydraulic cylinder which is interposed between and connected at its respective ends to the axle and frame of the vehicle. The letter $X_2$ indicates the position of the vehicle axle and the letter $X_3$ indicates the position of the vehicle frame. In FIG. 1 the forces, due to the rotational moments of the inertia of the vehicle about the roll, pitch and yaw axes, are omitted since these forces are not so great that their omission affects the overall stability analyzed in this simplified diagram. The line $f(t)$ indicates the input signal (hydraulic fluid) applied to the cylinder 10 for actuating the latter in controlling movement of the vehicle mass $M_2$ with respect to the forces acting on the latter, namely, the vertical movement of the tire, wheel and axle, normally transmitted to the vehicle frame through the main spring $K_2$. Equations describing the components illustrated in FIG. 1, for one wheel location, are as follows:

$$M_2 \ddot{X}_3 + K_2(X_3 - X_2) + f(t) = 0$$
$$M_1 \ddot{X}_2 + K_2(X_2 - X_3) + K_1(X_2 - X_1) = f(t)$$

where:

$M_1$ is the unsprung mass of the tire, wheel and axle;
$M_2$ is the sprung mass of the vehicle over one wheel location;
$K_1$ is the spring coefficient of the tire;
$K_2$ is the spring coefficient of the vehicle main spring;
$X_1$ is the road surface elevation;
$X_2$ is the position of the wheel axle;
$X_3$ is the position of the vehicle frame; and,
$f(t)$ is the input signal to the cylinder 10, an automatically computed function of the signal $\ddot{X}_3$, $(\dot{X}_3 - \dot{X}_2)$, $$\int_0^t \ddot{X}_3 dt$$

and electric signals $\theta$, $\phi$, and $\psi$ as more fully described hereinbelow. The single or double dot above the letter X indicates the respective first or second derivative of the signal X with respect to time.

*Bounce Control*

Figure 2:
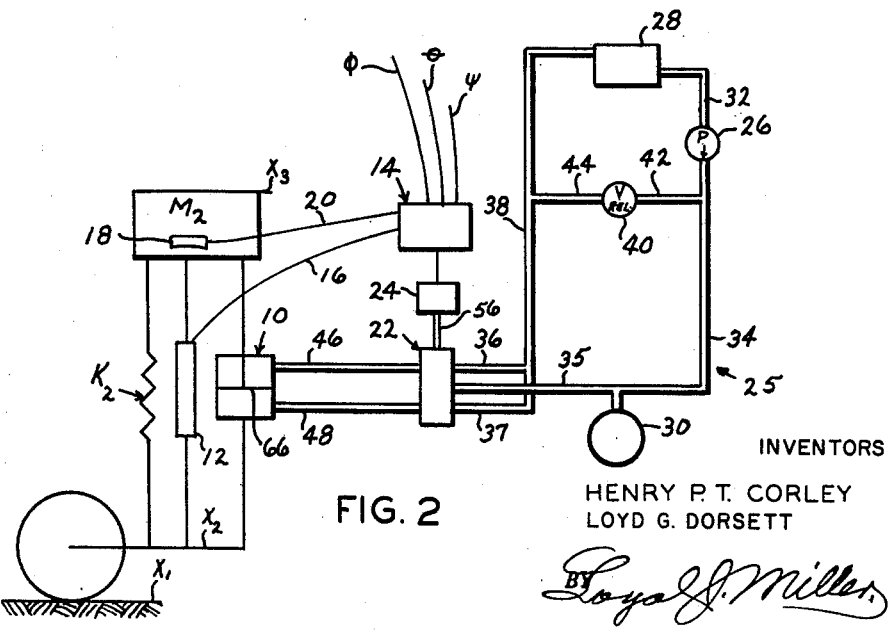
FIGURE 2 is a diagrammatic view of the suspension system and the components required for suspension control at one wheel location.

Referring to FIG. 2, a linear rate transducer 12 is mechanically connected in parallel between the vehicle frame and mass $M_2$ and the vehicle axle $X_2$. The transducer 12 transmits an electrical signal to an electronic computer 14 by a wire 16. The transducer signal varies in proportion to the rate of change of the distance between the axle $X_2$ and vehicle frame $X_3$.

An accelerometer 18 is mounted on the vehicle frame above the cylinder 10. The accelerometer senses the vertical acceleration of the vehicle frame $X_3$ and develops an electrical signal proportional to this acceleration. The accelerometer 18 is connected to the computer 14 by a wire 20. The vertical acceleration signal and the transducer signal are each separately amplified or filtered to achieve optimum response. In particular, the acceleration signal $\ddot{X}_3$ is fed into two separate paths to be processed by the computer; one path includes mainly amplification and some filtering; the other path includes integration as well as amplification and filtering. This means that in controlling bounce this suspension system essentially uses: vertical body acceleration signal feedback; vertical body velocity signal feedback; and vertical axle velocity signal feedback. All three of the foregoing variables receive separate and individual amplification. The vertical acceleration feedback is fundamental in improving the riding qualities of a vehicle. Roll, pitch, and yaw controls for vehicle suspension systems are not necessarily new; but this suspension system in electronically superimposing roll, pitch and yaw control upon bounce control assures that compressed springs at a wheel location will no longer mean a hard shock to the vehicle frame should the wheel pass over a road disturbance while the spring is compressed.

This suspension system uses strong vertical acceleration feedback signals when the vertical acceleration is itself not very large. This vertical acceleration signal is passed through a saturation or limiting circuit which prevents very high magnitude feedback signals from developing. As an alternative to the use of a saturation circuit, an accelerometer can be used which has a small range so that saturation occurs within the accelerometer itself.

Figure 8:
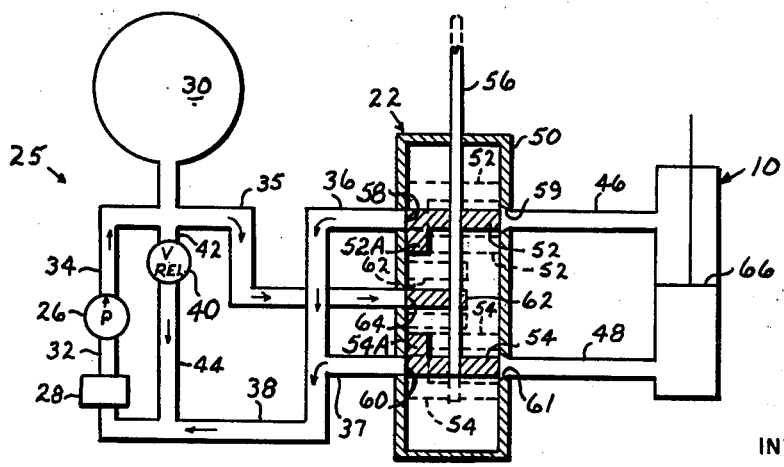
FIGURE 8 is a diagrammatic view of a special hydraulic system and servo controlled valve connected with a hydraulic cylinder.

The hydraulic cylinder 10 may be considered as replacing the conventional shock absorber, not shown; however, the conventional shock absorber could be used with or connected with the system. The hydraulic cylinder 10 is controlled by an open center hydraulic control valve 22 (FIG. 8). A conventional servo mechanism 24 is interposed between and connected with the computer 14 and the hydraulic control valve 22. A hydraulic control system 25 is connected to the control valve 22. The hydraulic control system comprises a hydraulic pump 26 connected with a reservoir 28 and an accumulator 30 by conduits 32 and 34 respectively. The accumulator is connected by a conduit 35 to the control valve 22. A hydraulic fluid return line 38 connects the control valve to the reservoir 28. An overpressure or by-pass valve 40 is interposed between and connected to the lines 34 and 38 on the pressure side of the pump 26 by conduits 42 and 44, respectively. Thus when the pump 26 has generated the desired fluid pressure within the accumulator 30 the by-pass valve 40 opens and permits the pump to circulate fluid through the reservoir 28. The control valve 22 is connected to the respective ends of the hydraulic cylinder 10 by conduits 46 and 48. Fluid pressure applied to the hydraulic cylinder 10 is indicated in FIG. 1 by the line $f(t)$.

Referring to FIG. 8 the hydraulic valve 22 includes a housing 50 to which the pressure line 35 is connected medially the ends of the housing. Return lines 36 and 37 are connected to the respective end portions of the housing 50 and joined to form the return line 38. A pair of valve disks 52 and 54 axially connected with a control rod 56 are slidable within the housing 50 for opening and closing the outlet ports 58 and 60, respectively, of the return lines 36 and 37. One end of the control rod 56 is connected with the mechanism 24. An intermediate valve disk 62, connected with the rod 56, opens and closes the fluid pressure inlet port 64. Thus when the control rod 56 moves the valve disks 52—54 and 62 upwardly, as viewed in FIG. 8, to the dotted line position, fluid pressure enters the housing 50 through the port 64 and is conveyed to the hydraulic cylinder 10 through the conduit 46 to move the hydraulic piston 66 downwardly. The port 58 is maintained closed by a depending disk lug 52A. Fluid in the hydraulic cylinder below the piston 66 is exhausted to the return line 37 through the line 48 and housing outlet 60. In this position the valve disk 54 prevents fluid pressure from entering the conduit 48. Similarly when the control rod 56 is moved downwardly, to the lowermost dotted position of the disks 52—54 and 62 shown in FIG. 8, the valve disk 52 prevents fluid pressure from entering the conduit 46 and permits fluid pressure to pass from the houisng 50 through the conduit 48 to be applied to the piston 66 to raise the latter and eject fluid through the conduit 46 to the return line 36 through the housing outlet 58. In this instance an upstanding disk lug 54A maintains the port 60 closed.

As shown in the drawings, the housing outlet ports 59 and 61, associated with the respective disks 52 and 54, are each larger than the cross sectional area of the adjacent peripheral surface of the disks so that when the disks are aligned with these outlet ports the latter are not closed. This permits fluid from the conduits 46 and 48 to circulate through the housing 50 in response to the movement of the cylinder piston 66 if the electronic control system should fail or when it is manually disconnected. In other words the hydraulic cylinder 10 performs the normal function of a shock absorber in resisting forces applied to the vehicle.

Figure 3:
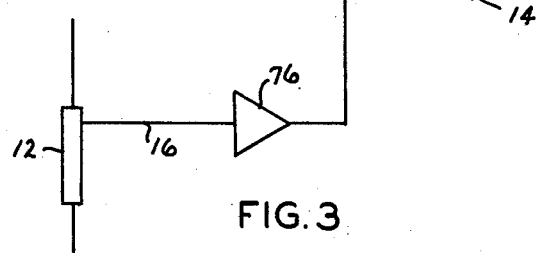
FIGURE 3 is a simplified electrical wiring diagram illustrating the electronic computation of bounce control signals.

Referring more particularly to FIG. 3, the electronic bounce control computer, associated with each respective wheel and indicated generally by the numeral 14, is actuated by signals from the accelerometer 18 and transducer 12, transmitted over wires 20 and 16, respectively. The error signal from the accelerometer passes through a limiting amplifier 70, an integrating amplifier 72 and suitable resistors to a summation amplifier 74. The error signal from the transducer 12 is transmitted through a non-linear amplifier 76 and a suitable resistor to the summation amplifier 74. The summation amplifier 74 transmits the signal designated $f(t)$ to the servo mechanism 24 which in turn actuates the hydraulic control valve 22.

The linear rate transducer signal at a particular wheel location measures $K_1(\dot{X}_3 - \dot{X}_2)$ where $\dot{X}_3$ is the vertical velocity of the body and $\dot{X}_2$ is the vertical velocity of the axle; $K_1$ is an arbitrary amplification constant. When the vertical body acceleration signal $\ddot{X}_3$ is integrated, a new variable $K_2 \dot{X}_3$ is obtained where $K_2$ is another arbitrary constant. As $(\dot{X}_3 - \dot{X}_2)$ becomes large, $K_1$ is automatically increased in a non-linear manner (FIG. 3).

The simultaneous attenuation of the vertical acceleration feedback signal and the increased amplification of the linear rate signal, for large level feedback signals, changes the damping characteristics of the vehicle in a preferred manner; the net result of this signal procedure is that small road disturbances may cause many small tire vibrations but the tire never loses contact with the highway surface because of the very small amplitude of the tire vibrations. Having traded body or frame vibrations for tire vibrations, the body or frame hardly vibrates at all when small road disturbances are encountered. As large road disturbances occur, the amplitude of the tire vibrations are not allowed to grow so large that the tire loses contact with the highway surface. Instead more vibrations of the frame are allowed, but the tire is not allowed to leave the surface of the highway for the purpose of dissipating bounce energy through large tire vibrations.

Thus an optimum ride commensurate with safety is achieved.

PITCH CONTROL

Referring more particularly to FIG. 4, an accelerometer 80 is mounted longitudinally on the vehicle frame which transmits a pitch error signal $+\theta$ through a normally closed switch S to forward or vehicle front end servo control amplifiers 82 and 83, forming a part of the pitch control computer, which in turn transmits signals $f(t)$ to the respective servo mechanism 24 connected to the respective hydraulic valve 22 (FIGS. 1 and 2) associated with the respective left and right front wheels 84 and 85 of the vehicle. The accelerometer signal is similarly conveyed to a phase inverting amplifier 86 transmitting a negative or inverted pitch error signal $-\theta$ to rearward or vehicle rear end servo control amplifiers 88 and 90 controlling the hydraulic pistons associated with the respective left and right rear vehicle wheels 91 and 92. Pitch control is thus accomplished by applying opposite forces to the respective hydraulic cylinders located at either end of the vehicle. Obviously these forces applied to the hydraulic cylinders act in such a direction to drive the pitch error to zero.

The longitudinal accelerometer 80 may be amplitude limited, either in the instrument itself or in the amplifiers processing its output, so that the pitch control circuit never develops a signal strong enough to level the vehicle on a very steep grade since such a development would allow insufficient margin for satisfactory bounce control to be accomplished. Pitch rate control is achieved directly by the bounce control mode of operation.

ROLL CONTROL

Referring to FIG. 5, roll control of the vehicle is achieved by mounting an accelerometer 94 laterally of the vehicle adjacent its forward end and similarly mounting another accelerometer 96 adjacent the rearward end of the vehicle. Negative roll error signal $-\phi_F$ from the accelerometer 94 is transmitted to the servo control means controlling the left front wheel location of the vehicle through a hydraulic cylinder servo control amplifier 98. This same roll error signal, $-\phi_F$, passes through an inventing amplifier 100 to transmit a positive signal $+\phi_F$ to an amplifier 102 controlling the right front wheel mounting. Positive error roll control $+\phi_R$ from the accelerometer 96 is transmitted directly to a hydraulic cylinder servo control amplifier 104 associated with the right rear wheel mounting. This same signal is applied to an inverting amplifier 106 to transmit negative $-\phi_R$ signal to a hydraulic cylinder servo control amplifier 108 associated with the left rear wheel mounting. The algebraic differences between the two output signals of the laterally mounted accelerometers 94 and 96 provides a yaw error signal $\psi$, as more fully explained hereinbelow.

An alternate roll error signal control is illustrated in FIG. 6 in which the front accelerometer 94 transmits a negative signal $-\phi_F$ directly to the left forward and rearward hydraulic cylinder servo control amplifiers 98 and 108 respectively associated with the forward and rearward left wheel mountings. Similarly the rear roll accelerometer 96 transmits a positive $+\phi_R$ signal to the right forward and rearward hydraulic cylinder servo control amplifiers 102 and 104 respectively associated with the front and rear right wheel mountings. In other words the $-\phi_F$ is the front roll error signal while $+\phi_R$ is the rear roll error signal. This alternate roll error signal control permits eliminating the two inverting amplifiers 100 and 106 shown in FIG. 5 by transmitting the $+\phi$ signal to one side of the vehicle and a negative, $-\phi$, signal to the opposite side as shown in FIG. 6 but not necessarily from accelerometers which correspond to the respective end of the vehicle receiving the roll correction.

An elementary textbook on the subject of mechanics lists the following formula for superelevation or roll control required to maintain a vehicle in such a configuration that there is no tendency toward skidding outward or slipping inward of objects riding on the frame of the vehicle:

$$e = \frac{v^2 d}{gr}$$

Where:

$e$ is the required superelevation in feet;
$v$ is the vehicle speed in feet per second;
$d$ is the distance (axle length) in feet between the left hand wheels and right hand wheels;
$r$ is the radius of the curve in feet; and,
$g$ is the gravitational constant in feet per second per second.

Probably the curve which constitutes the greatest petty annoyance or nuisance is that which is taken in urban driving at relatively low speeds.

The above formula is now applied for such a curve with a typical automobile axle length.

$v = 10$ m.p.h. $= 14.667$ ft. per second
$d = 5.0$ ft.
$g = 32.2$ ft. per second per second
$r = 40$. ft.

$$e = \frac{v^2 d}{gr} = \frac{(14.667)^2}{32.2} \times \frac{5.0}{40} = .835 \text{ ft.} = 10 \text{ inches}$$

For the purposes of this disclosure, the above example will be used as a "worst possible case" to be encountered by a sane, cautious driver. The same curve attempted at 20 m.p.h. would require a superelevation of more than three feet which would be impractical to achieve in a vehicle.

A net ten inches change in elevation of one side of the vehicle with respect to the other can be achieved by raising one side of the vehicle five inches while lowering the other side five inches. A simple hydraulic cylinder accomplishing this actuation would have a neutral or rest position length of fifteen inches.

YAW CONTROL

Figure 7:
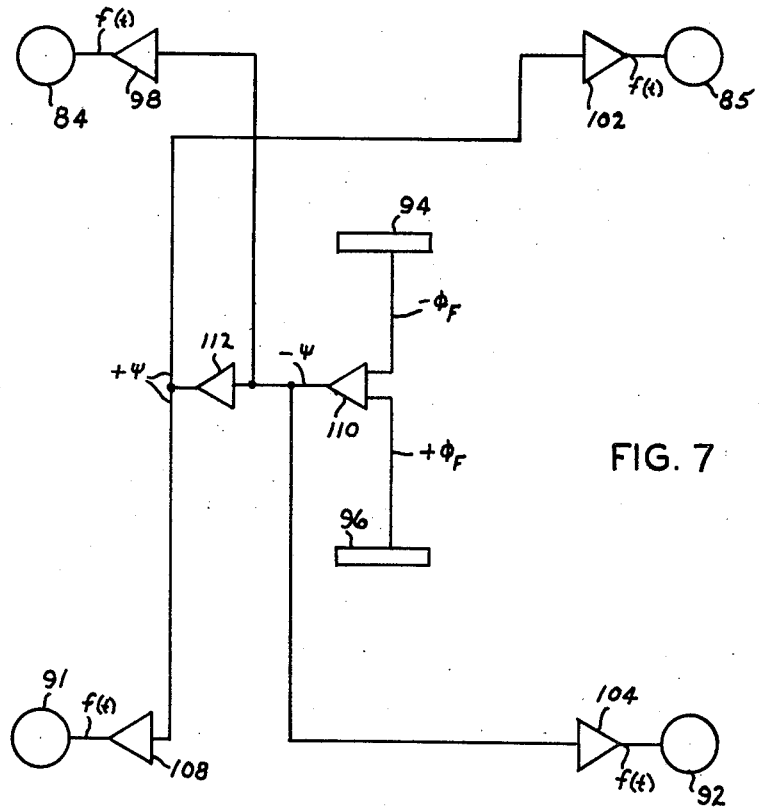
FIGURE 7 is a diagrammatic view illustrating yaw error control signal flow.

Referring more particularly to FIG. 7, the $+\phi_F$ signal from the front roll accelerometer 94 and the signal from the rear roll accelerometer 96 is fed to a summing amplifier 110 which transmits a $-\psi$ signal to the hydraulic cylinder servo control amplifiers 98 and 104, diagonally of the vehicle, to the left front wheel and right rear wheel mountings. The $-\psi$ signal is similarly transmitted to an inverting amplifier 102 to apply a $+\psi$ signal, diagonally of the vehicle, to the hydraulic cylinder servo control amplifiers 102 and 108 associated with the right front and left rear wheel mountings.

HEADLIGHT AIM

The automatic pitch control feature of the system may present an inaccurate aiming of headlights during night driving since pitch control of the vehicle frame would tend to aim the headlights too high going down grade and too low in ascending an up grade, therefore, the switch S illustrated in FIG. 4 may be connected to the vehicle headlight switch to interrupt signals from the pitch control accelerometer 80 when the headlights are turned on.

PARAMETER ADJUSTMENTS

The instant suspension system is factory or custom tailored for application to a particular vehicle of a particular weight, size and road characteristics. Analog computer experiments have revealed that if parameter adjustments are chosen which will assure stability of an empty vehicle then the system will remain stable for heavier loadings of the vehicle. In adapting the instant suspension system to a particular vehicle the following parameters are set to particular gain values to achieve optimum overall performances:

(1) Pitch error;
(2) Yaw error;
(3) Roll error;
(4) Integral of vertical acceleration error, for each location;
(5) Vertical acceleration error, for each wheel location. This includes automatic non-linear attenuation of the vertical acceleration error signal; and,
(6) Linear rate feedback, or velocity error signal, for each wheel location. This includes automatic non-linear amplification of the rate feedback signal.

From the above, it is seen that six different circuit characteristics are required for a particular vehicle. These are simply gain settings for the amplifiers shown in the drawings.

Examples

It is assumed that a vehicle has the following characteristics for one wheel location (FIG. 1):

$M_2 = 36$. slugs=mass of body over one wheel.
$M_1 = 3.0$ slugs=mass of wheel, tire and axle at one wheel location.
$K_1 = 13,775$. lbs. per foot=tire "spring" constant.
$K_2 = 4,577$. lbs. per foot=main spring constant.

For small road disturbances, the above vehicle is adequately stabilized with the following feedback variables at the gain settings shown:

Body acceleration: 1,012 pounds per foot per second per second. (This is the parameter 5.)
Body velocity: 2,617.5 pounds per foot per second. (This is the parameter 4.)
Rate of change of distance between body and wheel hub 360.5 pounds per foot per second. (This is the parameter 6.)

It is suggested that the gain settings for the roll, pitch and yaw error signals be adjustable from 300 to 2,000 pounds per foot per second per second; 1,000 pounds per foot per second per second is suggested as a working value. (These gain settings correspond to parameters 1, 2 and 3.)

In the above example, it can be shown by solution of the applicable differential equations applied to FIG. 1 that the vertical vibrations, or acceleration peak values, encountered as a result of striking a low curb will be reduced at least by a factor of five as compared to what would be encountered in a conventional vehicle.

Referring more particularly to FIG. 9, the numeral 120 indicates an oscillographic chart and recording of a computer simulated conventional suspension system. The heavy line 122 indicates the original elevation of a highway and the dotted line 124 indicates a change in the highway elevation beginning at zero time. The heavy wavy line 126 indicates the change in vehicle frame position as a result of a highway elevation change through a time lapse of five seconds. The line 128 on the lower portion of the chart indicates one "g" of gravitational attraction. The line 130 indicates a magnitude of 2.7 g's. The wavy line 132 indicates the acceleration of the vehicle frame produced by a step change in the highway elevation and the rate of damping of these accelerations for a time lapse of five seconds.

Referring to FIG. 10, the numeral 140 indicates a similar conventional oscillographic chart calibrated to a larger scale for the displacement values. Similarly the numerals 122 and 124 indicate the original elevation of highway and step change of the highway beginning at zero time. The line 142 describes the position change of the vehicle frame encountering the identical step change in highway elevation encountered by the vehicle in FIG. 9 for a time lapse of two seconds. The lower portion of the chart 140 depicts the accelerations produced by the step change in highway elevation with respect to the one "g" line 128 while the line 144 indicates the maximum of 1.25 g's acceleration produced. The wavy line 146 records the rapid damping of a vehicle frame accelerations during a maximum time lapse of two seconds under computer simulation of the instant suspension system.

Thus it may be seen, from an examination of FIGS. 9 and 10, that the inclemental peak acceleration of the vehicle frame in FIG. 10 is 6.8 times lower than that of the conventional vehicle suspension system graphically recorded in FIG. 9.

Obviously the invention is susceptible to some change or alteration without defeating its practicability, and we therefore do not wish to be confined to the preferred embodiment shown in the drawings and described herein further than we are limited by the scope of the appended claim.

We claim:

A suspension control system for a vehicle having wheel supported axles and having a vertically movable frame supported in spaced relation above said axles, comprising: a hydraulic cylinder interposed between and connected with said frame and said axle at each wheel position; a position control apparatus for controlling the actual position of said frame relative to a predetermined desired position of said frame with respect to the variable elevations of a wheel supporting surface, said control apparatus including a hydraulic system having a valve operatively connected with each said hydraulic cylinder, a servo mechanism connected with each hydraulic valve, signal computing means connected with said servo mechanism; a bounce control accelerometer connected with said frame above each respective wheel position; a transducer interposed between and connected to said frame and the respective said axle; a pitch control accelerometer longitudinally mounted centrally of said frame; and a roll and yaw control accelerometer transversely mounted at the respective forward and rearward ends of the vehicle, said accelerometers and transducers being connected with said computing means and each providing an output signal to said computing means whose amplitude is a function with respect to time of the respective forces applied to the vehicle frame by movement of the vehicle across a supporting surface, said computing means transmitting integrated output frame corrective positioning signals to said servo mechanism and actuating said hydraulic cylinders and positioning said frame in a desired predetermined position.

References Cited in the file of this patent

UNITED STATES PATENTS

| | | |
|---|---|---|
| 2,860,889 | Hanna | Nov. 18, 1958 |
| 2,865,462 | Milliken | Dec. 23, 1958 |
| 2,967,062 | D'Avigdor | Jan. 3, 1961 |
| 2,976,052 | Hanna | Mar. 21, 1961 |
| 3,038,739 | Vogel | June 12, 1962 |